Figure 1:
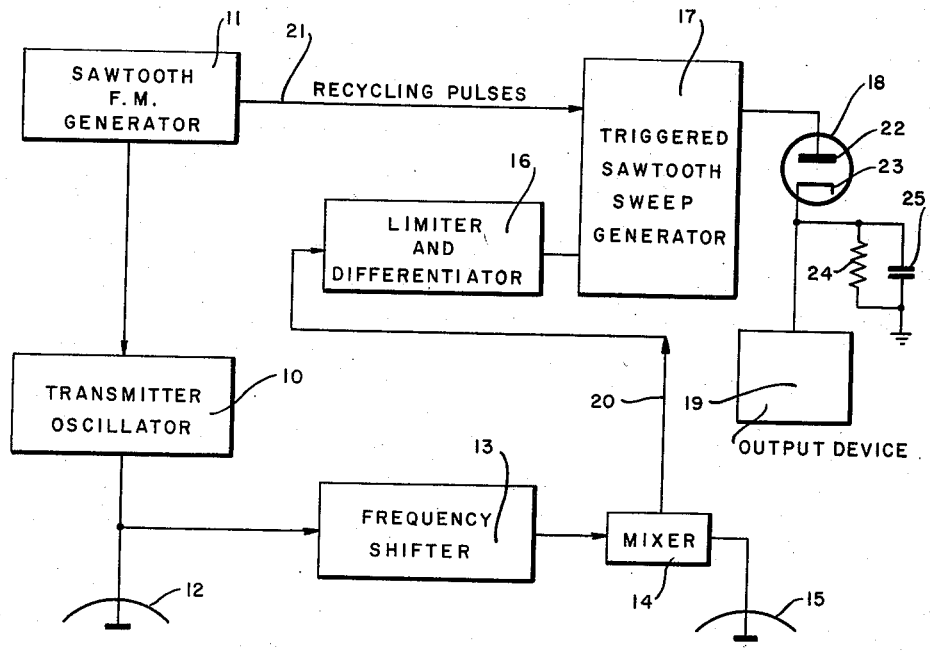

Aug. 16, 1960

D. D. WILLIAMS 2,949,604

RADAR BLIND LANDING INDICATOR

Filed Dec. 31, 1956

INVENTOR
Donald D. Williams,
BY

AGENT.

United States Patent Office 2,949,604
Patented Aug. 16, 1960

2,949,604

RADAR BLIND LANDING INDICATOR

Donald Dickinson Williams, Los Angeles, Calif., assignor to Hughes Aircraft Company, Culver City, Calif., a corporation of Delaware Filed Dec. 31, 1956, Ser. No. 631,843

6 Claims. (Cl. 343—14)

This invention relates to instantaneous altitude and rate-of-descent indication means for aircraft and more particularly to a radar flare-out indicator permitting blind landing of aircraft.

When an aircraft is landed it is generally piloted into the runway of an airfield in accordance with a predetermined path slope as the craft lowers to and approaches the runway. This path slope has been described as "flare-out." Under poor conditions of visibility, or under any circumstances where a "blind" landing is necessary some method of directly indicating the approach of the craft and its position with respect to the ground is desirable. Preferably such a blind landing indicator should be in the landing aircraft and independent of ground communications equipment.

One desirable landing path is the exponential flare-out path of approach to the ground, in which the rate of descent of the aircraft is proportional to its height above the ground.

This invention contemplates an indicating instrument by which a pilot may land his aircraft under low or no visibility conditions and maintain his landing path by keepng the instrument indicator at a predetermined point. The instrument used according to this invention results in an exponential flareout landing path.

The instrument of this invention is incorporated in an aircraft and includes a microwave transmitting oscillator which is frequency modulated by a sawtoothed wave. The transmitter is coupled to an antenna directed at the ground beneath the aircraft. A receiver is provided with its antenna also directed at the ground to receive reflections of signals transmitted to the ground by the transmitter. A portion of the output of the transmitter is applied through a cyclically operating phase shifting network or other frequency shifting device to the receiver. The receiver receives a signal directly from the transmitter at the phase or frequency shifted transmitted frequency along with the reflected signal from the ground at the originally transmitted frequency which has been shifted in frequency by the Doppler effect and by the propagation delay of the frequency modulated signal to develop an audio frequency signal at the difference frequency between the frequency shifted transmitter signal and the reflected signal.

The received signal differs in frequency from the transmitted signal due to two effects; these are the propagation delay of the original frequency modulated signal which gives a shift proportional to altitude; and the Doppler shift, which is proportional to rate of descent. If the aircraft is flown on a path such that the received and transmitted signals are at the same frequency, the two sources of frequency shift cancel each other and the rate of descent is proportional to the altitude resulting in an exponential glide path. The frequency shifter is employed in order to make it possible to determine whether the received signal is at a higher or a lower frequency than the transmitted signal, which is necessary in order to indicate the correction which must be applied to the aircraft path of descent if an error should exist. Because of the presence of the frequency shifter, the receiver output frequency is the difference between transmitted and received frequencies, plus the shift frequency (or frequency of rotation if a continuously rotating phase shifter is used to shift frequency). By comparing the receiver output frequency and the shift frequency, the magnitude and direction of the error can be determined.

It is accordingly an object of this invention to provide a radar blind landing flare-out indicator for aircraft utilizing instruments for comparing the frequency shift due to propagation delay of a frequency modulated transmitted signal with the Doppler shift in frequency of the reflected signal due to the rate of descent of the landing aircraft.

It is another object of this invention to provide a flare-out indicator wherein a cyclically operating frequency shifter is employed between the transmitter and receiver in order to permit determination of the sense of any deviation from a predetermined rate of descent corresponding to an exponential landing path.

It is a further object of this invention to provide an indicator for the rate of descent of an aircraft on landing by which the pilot may land the craft under poor conditions of visibility at an airport.

It is yet another object to provide a radar flare-out indicator for a predetermined safe rate of descent for blind landing of aircraft.

Figure 2:
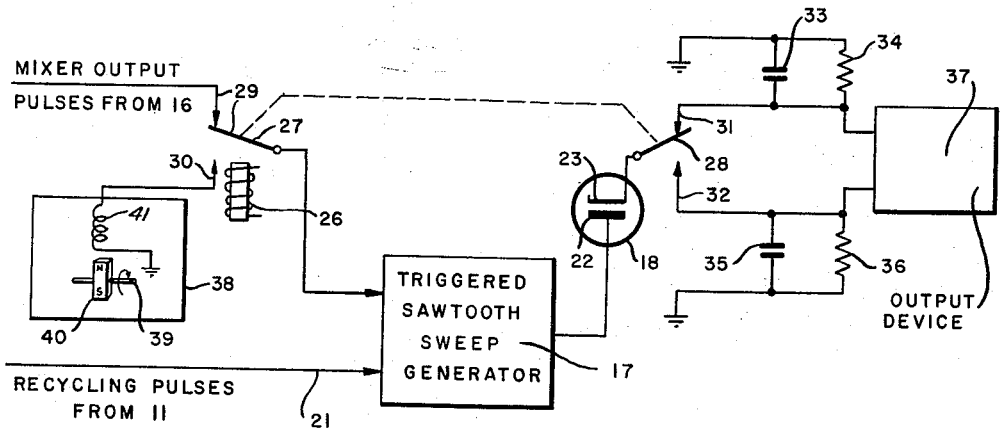

These and other objects of this invention will be more clearly understood from the following specification and claims when taken together with the drawing in which:

Fig. 1 is a partially schematic and block diagram of the flare-out indicator according to this invention; and Fig. 2 is a partial block and circuit diagram of a detail of one aspect of the invention.

Referring now to Fig. 1 there is shown a block diagram of a radar flare-out indicator according to this invention. Block 10 is a transmitter oscillator preferably operated at a frequency in the microwave region. A sawtooth frequency-modulation (FM) generator 11 is electrically connected to transmitter oscillator 10 to modulate the frequency of the transmitted wave in sawtooth fashion. Consequently, the combination of generator 11 and oscillator 10 provides a sawtooth frequency-modulated transmitter oscillator at some microwave frequency. Transmitter oscillator 10 is coupled to transmitting antenna 12 which radiates the sawtooth frequency-modulated microwave signal. Antenna 12 may be installed beneath the wings of an aircraft and directed towards the ground.

A frequency shifter 13 is also coupled to the output of transmitter oscillator 10 and to one input of a mixer 14. Another input of mixer 14 is coupled to a receiving antenna 15 also pointing toward the ground. The output of mixer 14 via lead 20 is coupled to a limiter and differentiator 16 which is in turn coupled to a triggered sawtooth sweep generator 17. Sawtooth FM generator 11 is also coupled by a lead 21 to triggered sawtooth sweep generator 17. A rectifier 18 is coupled by its anode 22 to the output of triggered sawtooth sweep generator 17. A resistor 24 and capacitor 25 are connected in parallel to form a charging network which is connected from cathode 23 of rectifier or diode 18 to ground.

An output indicating device 19 is coupled to the cathode 23 of rectifier 18. Output device 19 may be a vacuum-tube voltmeter or other device for indicating the direct-current level of the charge on capacitor 25. The combination of diode 18, with charging network 24, 25, and output indicating device 19 constitutes a peak detector.

In Fig. 2 an alternative arrangement of the system of Fig. 1 is shown wherein triggered sawtooth sweep generator 17 receives recycling pulses on lead 21 as before from sawtooth FM generator 11 but wherein the output of limiter-differentiator 16 is coupled to triggered sawtooth generator 17 by way of the fixed contact 29 of an alternating relay 26. Relay 26 has two arms 27 and 28 mechanically coupled together as indicated by the dotted line. Arm 27 is associated with upper contact 29 which is contacted by arm 27 when relay 26 is deenergized and lower contact 30 which is contacted by arm 27 when relay 26 is energized. Arm 27 is connected to the input of triggered sawtooth generator 17. Arm 28 is associated with upper contact 31 which is contacted by arm 28 when relay 26 is deenergized and lower contact 32 which is contacted by arm 28 when relay 26 is energized. Arm 28 is connected to cathode 23 of rectifier 18. Contact 30 is connected with a pickup coil 41 forming part of a phase-shifter reference pulse generator 38. Phase-shifter reference pulse generator 38 includes a rotary shaft 39 to which may be connected a magnet 40. Magnet 40 is rotated near pick up coil 41, the shaft 39 in such a case forming part of frequency shifter 13 when frequency shifter 13 is a rotary device.

If the frequency shifter 13 is a passive device, then the rotary reference pulse generator of 38 may also be a passive device, the reference pulses then being a current change or voltage change having a value corresponding to the driving signal for the passive frequency shifter device.

Contact 31 is coupled to a first charging network comprising a capacitor 33 and a resistor 34 connected in parallel and also connected to one terminal of an output device 37. Contact 32 is coupled to a second charging network comprising a capacitor 35 and a resistor 36 connected in parallel and also connected to another terminal of the output device 37. The return side of each of the above described charging networks 33, 34 and 35, 36 is connected to ground.

Output device 37 may be any indicating instrument which measures and indicates the difference in potential between the above described two charging networks, 33, 34 and 35, 36. This may be a balanced vacuum tube voltmeter.

The operation of the radar flare-out indicator of this invention may be described with reference to Figs. 1 and 2.

Transmitter oscillator 10 and sawtooth FM generator 11 installed in an aircraft combine to transmit through antenna 12 a sawtooth frequency-modulated microwave signal, the instantaneous frequency of which may be written: $f_t = f_0 + bt$, where $t$ denotes time, $b$ is a modulation coefficient, and $f_0$ is the nominal transmitted frequency.

The microwave oscillator 10 and sawtooth generator 11 may incorporate any conventional sawtooth frequency modulation technique suitable for a microwave oscillator. Many are well-known. One such technique is disclosed on pp. 23–24 of "Technique of Microwave Measurements," vol. 11, of the M.I.T. Radiation Laboratories Series, published 1947 by McGraw-Hill Book Co. Inc., New York.

The signal $f_r$ received by receiving antenna 15 from the ground at a distance $h$ below the aircraft differs in frequency from the instantaneous frequency transmitted because of the time delay and Doppler effect, so that $$f_t - f_r = 2bh/c + 2\dot{h}f_0/c \cong f_s$$

when $c$ is the velocity of light $\cong 10^9$ ft./sec.

For example, for a frequency $f_0 = 10$ kilomegacycles/second and for $b = 3$ kilomegacycles/second 2, then $f_s$ (in c.p.s.) $= 6(h + 3.3\dot{h})$, where $h$ is in feet and $\dot{h}$ in feet per second. Therefore if the aircraft flies such a landing path as to reduce $f_s$ to zero, it describes an exponential flare-out path with a time constant $f_0/b = 3.3$ sec.

The frequency shift $f_s$ is then a measure of the deviation from such a path. It is this frequency shift $f_s$ which is to be measured with the apparatus of this invention.

To make the measurement of the magnitude of $f_s$ possible and the sense thereof the transmitted frequency $f_t$ may be modulated to a higher frequency $f_t + f_c$. This may be done by a continuously rotating phase shifter shown in Fig. 1 by block 13 called frequency shifter.

The cyclically shifted transmitted frequency $f_t + f_c$ is mixed with the received frequency $f_r$ in mixer 14. The resultant deviation of the difference or beat frequency from $f_c$ is measured, $(f_t + f_c - f_r)$.

Since the discontinuity of the beat frequency phase occurring at the recycling time of the frequency modulated sawtooth wave gives rise to a loss in accuracy of devices of this type unless the frequency deviation is made very large it is more desirable to measure the beat period rather than the beat frequency. The recycling pulses are applied to triggered sawtooth sweep generator 17 from sawtooth wave generator 11.

To measure the beat period where $f_c$ is appreciably larger than the sweep repetition rate, the output signal of mixer 14 is strongly clipped and differentiated in the equipment indicated by block 16. The pulses thus obtained have a period of $1/(f_c + f_s)$. To these pulses are added a train of pulses occurring every time the sawtooth wave generator 11 recycles. The resultant signal is used to trigger sawtooth sweep generator 17. The peaks of the resulting sawtooth wave form are stored in the charging network 24, 25 after being rectified by rectifier 18. Because of the presence of diode 18, sawtooth waves which begin or end with a recycling pulse are not stored because they have a duration less than $1/(f_c + f_s)$. The triggered sawtooth sweep generator is well known in the art and may be a thyratron relaxation oscillator circuit such as shown on page 490 of the book "Theory and Application of Electron Tubes" by Herbert J. Reich, second edition, published by McGraw-Hill Book Co. in 1944. The recycling pulses on the lead 21 are combined with the differentiated pulses on the output of differentiator 16 such as a conventional summing transformer having two biased input windings and a single biased output winding. The summed pulses are passed as trigger signals to the above-mentioned thyratron relaxation oscillator circuit to form the sawtooth waves which are passed to the rectifier 18.

The indicating device 19 connected to diode 18 shows the charge on the network 24, 25 as a voltage indication.

When the indicating arrangement of Fig. 2 is used relay 26 is operated by some alternating current source such as, perhaps, a 60 cycle power supply to alternately, during its deenergized condition, charge up network 33, 34 from pulses derived from the output signal of the mixer 16 and during the energized condition of relay 26 charge up network 35, 36 from pulses derived from the reference pulses generated by the phase shifter reference pulse generator 38.

A balanced vacuum tube voltmeter may be used as the output device 37 to indicate the potential difference in the charge between the two networks 33, 34 and 35, 36.

In either the case of the vacuum tube voltmeter 19 or the balanced vacuum tube voltmeter 37, the indication thereon is a measure of the charge or difference in charge on the respective charging networks. This measured charge is representative of the deviation $(f_s)$ of the path of descent of the aircraft from the predetermined exponential landing path with the time constant $f_0/b$ seconds.

If the indicating device of Fig. 1 is used there may be a variation in the rate of rise of the sawtooth waves generated by the triggered sawtooth sweep generator 17 which will affect the output reading. If the indicating device of Fig. 2 is used, such variations in the sawtooth waves will be cancelled out, because they will appear on both charging networks in equal amounts and balance out in the indicator 37.

There has been described above a device for indicating the deviation of a landing aircraft from a predetermined exponential flare-out path of descent and rate of descent.

A pilot guiding his craft in for a landing will make a correct and safe landing under conditions of poor visibility if he maintains his rate of descent so that the deviation $f_s$ is equal to zero which will correspond to some particular reading on an indicator in his cockpit.

What is claimed as new is:

1. A blind landing indicating system for aircraft comprising: a transmitter; a first antenna coupled to said transmitter for radiating a signal generated by said transmitter; a frequency shifter coupled to said transmitter for cyclically shifting the frequency of a portion of the signal generated by said transmitter; a receiver for receiving ground echoes of the signals transmitted by said transmitter; a second antenna coupled to said receiver, said receiver being also coupled to said frequency shifter; a demodulating network coupled to said receiver for developing an audio frequency signal representative of the difference in frequency of the frequency shifted signals and the echo signals received by said receiver and corresponding to the rate of descent; sawtooth waveforming means connected to said demodulating network to respond to said difference in frequency to form a sawtooth wave; a charging network coupled to said sawtooth waveforming means for developing a charge corresponding to said difference in period of said sawtooth wave; and a voltage indicating device coupled to said charging network for indicating the value of said charge, whereby an aircraft may be landed along a predetermined flare-out path by maintaining a predetermined indication corresponding to a predetermined rate and path of descent by means of said voltage indication device.

2. An indicating system for displaying information corresponding to the deviation of a landing aircraft from a predetermined flare-out path and rate of descent comprising: a sawtooth frequency-modulated radio frequency signal transmitter; a frequency shifter coupled to said transmitter for cyclically shifting the frequency of a portion of the signal generated by said transmitter; a receiver adapted for receiving ground echoes of the signals transmitted by said transmitter and coupled to said frequency shifter for receiving frequency-shifted signals from said transmitter; a demodulating network for developing signals representative of the difference in frequency between said frequency-shifted signals and said echoes received by said receiver; a sawtooth generator connected to respond to said signals from said demodulating network to form sawtooth waves and a peak detecting voltmeter coupled to said sawtooth generator for indicating said difference in frequency, whereby an aircraft may be landed along said predetermined flare-out path and at a predetermined rate of descent by maintaining the indication of said peak detecting voltmeter at a predetermined value.

3. An indicating system for displaying information corresponding to the deviation of a landing aircraft from a predetermined flare-out path and rate of descent comprising: a sawtooth wave generator; a radio frequency signal transmitter coupled to said sawtooth wave generator for developing a frequency modulated output signal; a frequency shifter coupled to said transmitter for cyclically shifting the frequency of a portion of the frequency-modulated signal developed by said transmitter; a receiver adapted for receiving ground echoes of the frequency modulated signals transmitted by said transmitter and coupled to said frequency shifter for receiving frequency shifted signals from said transmitter; a limiting and differentiating network coupled to said receiver for developing pulses representative of the difference in frequency between said frequency shifted signals and said echoes received by said receiver; a triggered sawtooth sweep wave generator coupled to said sawtooth wave generator and to said limiting and differentiating network for developing a sawtooth wave out of said sawtooth sweep generator for each of said pulses occurring between the waves generated by said sawtooth wave generator; and a peak detecting voltmeter coupled to said triggered sawtooth sweep wave generator for indicating the peak amplitude of said sawtooth waves out of said sawtooth sweep generator corresponding to said difference in frequency, whereby an aircraft may be landed along said predetermined flare-out path and at a predetermined rate of descent by maintaining the indication of said peak detecting voltmeter at a predetermined value.

4. An indicating system for displaying information corresponding to the deviation of a transmitted pulse from a received pulse comprising: a first sawtooth generator; a frequency-modulated signal transmitter for forming signals varying sequentially in frequency in response to said first sawtooth generator; an antenna for transmitting said signals from said transmitter; a frequency shifter connected to said transmitter for also receiving said signals from said transmitter and for shifting the frequency of said signals; a receiver for receiving said transmitted signals from said transmitter; a mixer connected to said frequency shifter and said receiver for developing a signal of a frequency representing the difference between said frequency shifted signals and said signals from said receiver; means connected to said mixer for developing a pulse indicating signal from each signal developed by said mixer; a second sawtooth generator for forming a sawtooth wave, connected to said means for developing a pulse indicating signal; a charging network connected to said second sawtooth generator for forming a signal indicating the average potential of said sawtooth waves, and a display device connected to said charging network to display the average potential of said sawtooth waves.

5. An indicating system for transmitting signals and for receiving said signals frequency shifted by the Doppler shift and by the propagation shift and for indicating the relative frequency of the Doppler shift and the propagation shift comprising: a first sawtooth signal forming means; transmitter means connected to said first sawtooth signal forming means for forming and transmitting signals of a frequency which is periodically modulated through a frequency range; a frequency shifter connected to said transmitter for also receiving said formed signals and for cyclically shifting the frequency of said signals; receiving means for receiving signals from said transmitting means; a mixer connected to said frequency shifter and said receiving means to form a signal indicating the frequency difference between said signals from said frequency shifter and said received signals; a second sawtooth signal forming means connected to said mixer to form sawtooth waves in response to the pulses of said signals from said mixer; and means including a signal storage network connected to respond to said sawtooth waves from said second sawtooth signal forming means to form a potential indicating the frequency difference between said transmitted signals and said signals from said frequency shifter thus indicating the relative frequency of the Doppler shift and the propagation shift.

6. An indicating system for displaying information indicating the frequency difference between a transmitted and received pulse comprising: a first sawtooth generator; a frequency modulated signal transmitter connected to said sawtooth generator for forming frequency modulated signals and transmitting said signals; a frequency shifter connected to said transmitter for also receiving said signals formed by said sawtooth generator and shifting the frequency of said signals relative to said transmitted signals; a receiver for receiving signals transmitted from said transmitter; a mixer connected to said frequency shifter and said receiver for developing a difference signal representing the frequency difference between said frequency shifted signals and said signals from said receiver; pulse forming means responding to said difference signal for forming a period indicating pulse; a second sawtooth sweep generator; reference means to produce a train of pulses synchronous with said pulses from said frequency shifter; a relay including a first two position switch connected to said second sawtooth sweep generator and from said pulse forming means in one position and connected from said reference means in the other position; said relay also including a second two position switch connected from the output of said second sawtooth sweep generator; a first charging network connected to one output position of said second switch; a second charging network connected to the second output position of said second switch; and an output device connected to the output of said first and second charging means to indicate the difference between said charges, whereby said first charging network receives signals from said mixer and said second charging network receives signals from said reference means so that said potential difference at said output device indicates the frequency difference between said transmitted signals and said signals received by said receiver.

References Cited in the file of this patent

UNITED STATES PATENTS

| | | |
|---|---|---|
| 2,222,587 | Sanders | Nov. 19, 1940 |
| 2,533,871 | Blitz | Dec. 12, 1950 |
| 2,769,158 | Schultz | Oct. 30, 1956 |